United States Patent [19]

Otto et al.

[11] Patent Number: 5,129,744
[45] Date of Patent: Jul. 14, 1992

[54] TWO COMPONENT BEARING SEAL WITH BUMPERS

[75] Inventors: Dennis L. Otto, Malvern, Ohio; Jon A. Chandler, Brighton; Joseph A. Abbruzzi, Waterford, both of Mich.; Mark E. Baker, Massillon, Ohio

[73] Assignee: The Timken Company, Canton, Ohio

[21] Appl. No.: 716,136

[22] Filed: Jun. 17, 1991

[51] Int. Cl.⁵ ............................................. F16C 33/78
[52] U.S. Cl. .................................... 384/486; 277/152
[58] Field of Search ............... 384/477, 484–486; 277/152

[56] References Cited

U.S. PATENT DOCUMENTS

| | | | |
|---|---|---|---|
| 3,021,161 | 2/1962 | Rhoads et al. | 277/37 |
| 3,341,265 | 9/1967 | Paterson | 384/486 |
| 4,185,838 | 1/1980 | Danner | 277/58 |
| 4,434,985 | 3/1984 | Sonnerat | 277/37 |
| 4,501,431 | 2/1985 | Peiskes et al. | 277/152 X |
| 4,516,783 | 5/1985 | Mitsue et al. | 277/50 |
| 4,692,040 | 9/1987 | Ebaugh et al. | 384/484 |
| 4,770,424 | 9/1988 | Otto | 277/25 |
| 4,770,548 | 9/1988 | Otto | 384/478 |
| 4,799,808 | 1/1989 | Otto | 384/481 |
| 4,819,949 | 4/1989 | Otto | 277/29 |
| 4,856,794 | 8/1989 | Boyers et al. | 277/152 X |
| 4,962,936 | 10/1990 | Matsushima | 277/152 X |
| 5,022,659 | 6/1991 | Otto | 277/1 |

Primary Examiner—Thomas R. Hannon
Attorney, Agent, or Firm—Gravely, Lieder & Woodruff

[57] ABSTRACT

A seal for a roll neck bearing has a two interlocked components - a rotating component fitted to the inner race of the bearing and a stationary component fitted to the outer race. The rotating component includes a shield which fits around the end of the inner race, and, while it establishes a static barrier along the inner race, it can float or be displaced axially on the inner race. The stationary component has a seal case which fits snugly in a bore that opens out of the end of the outer race, it being trapped in that bore by a chock into which the bearing fits. Both the shield and case have axial walls and radial walls, and at the ends of their radial walls carry elastomeric seal elements. The seal element of the shield contacts the axial wall of the seal case, whereas the seal element of the seal case contacts the axial wall of the shield and further establishes a labyrinth along the shield. The two seal elements include bumpers which are presented toward the radial walls and limit the distance the rotating component may be displaced axially relative to the stationary component.

25 Claims, 2 Drawing Sheets

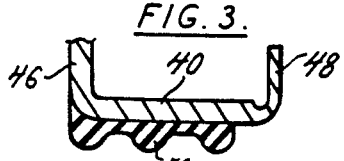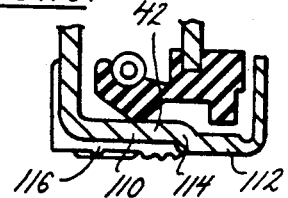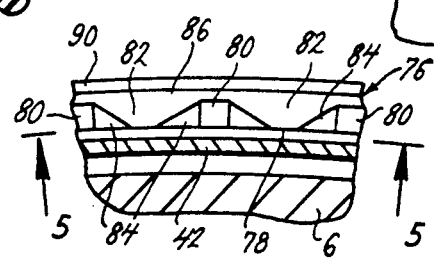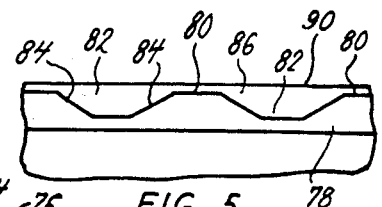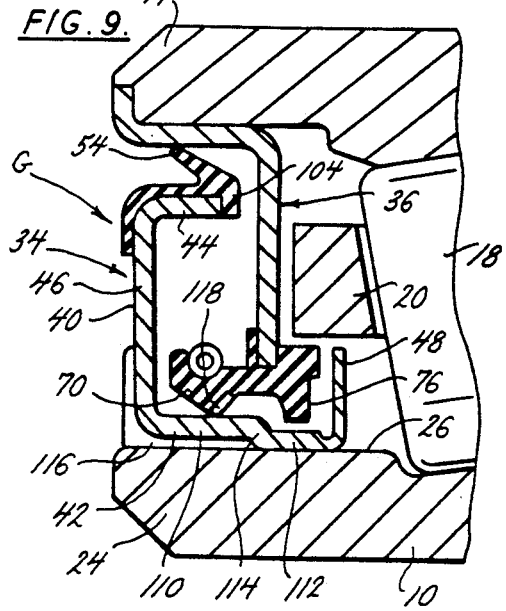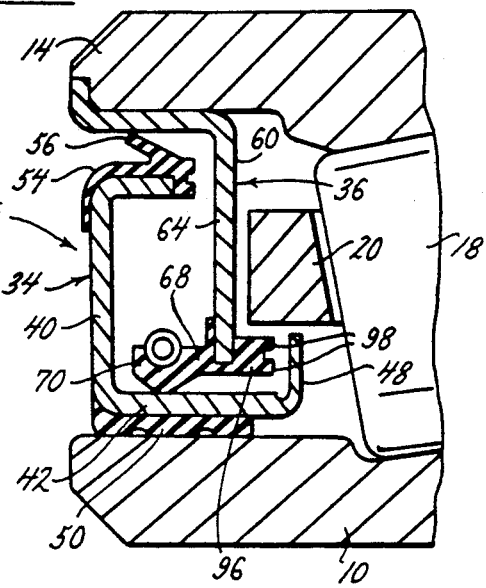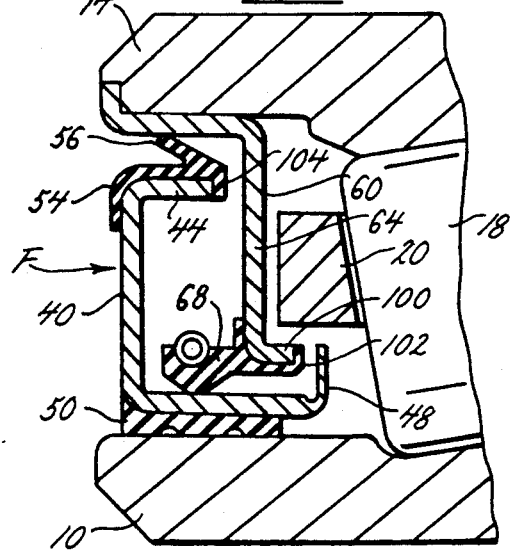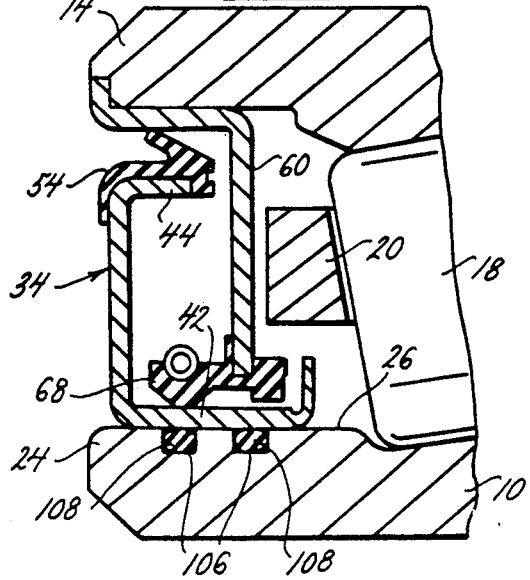

TWO COMPONENT BEARING SEAL WITH BUMPERS

BACKGROUND OF THE INVENTION

This invention relates in general to seals and, more particularly, to a two component seal which will accommodate large axial displacements.

The bearings on which work rolls of rolling mills turn operate in an extremely hostile environment, and the same holds true, perhaps to a somewhat lesser measure, for the bearings of the back-up rolls. These bearings must not only resist heavy radial loads applied by the rough shapes which pass between their rolls, but they must further withstand the severe impacts to which the rolls are subjected. Furthermore, the mills often operate with water cascading over their rolls and likewise over the chocks in which the bearings for the rolls are located.

The impacts encountered by a mill roll often translate into axial displacements between the mill roll and the chocks in which its bearings are housed. Some of the displacement produces deflections in the bearings themselves, while the rest is taken up in the end play with which the bearings are initially set and in axial clearances within the bearing mountings. In any event, the seals which keep contaminants out of the bearings must accommodate these displacements without admitting contaminants.

Traditionally, the seals for the bearings of mill rolls have been fitted to the chocks which house the bearings, and these chocks have adequate space to accommodate multiple seals which bear against the roll neck or wear rings around the roll neck. Lately, bearing manufacturers have fitted seals to the bearings themselves to provide an extra measure of protection for the bearings. The ends of the bearings offer little space for seals, and as a consequence the seals of necessity must be quite compact. Most have only one lip. Some require a separate seal carrier for the seal, and that is another costly part that can be damaged in storage or transit, and if so damaged, will admit contaminants to the interior of the bearing it is designed to protect.

The present invention resides in a two component seal that fits into the end of a bearing and has a plurality of seal contacts between the two components so as to effectively isolate a region beyond the seal. The one component may float axially relative to the other component within limits established by bumpers.

DESCRIPTION OF THE DRAWINGS

In the accompanying drawings which form part of the specification and wherein like numerals and letters refer to like parts wherever they occur:

FIG. 3 is a partial sectional view showing the drive ring for coupling the rotating seal component to the inner race of the bearing when that ring is undistorted by the bearing;

FIG. 4 is a fragmentary sectional view of the seal taken along line 4—4 of FIG. 2 and showing the pumping cavities of the seal;

FIG. 5 is a view of the labyrinth lip taken along line 5—5 of FIG. 4;

FIG. 6 is a partial sectional view of a modified seal;

FIG. 7 is a partial sectional view of another modified seal;

FIG. 8 is a sectional view of a seal having a modified drive arrangement for coupling the rotating seal component to the inner race of the bearing;

FIG. 9 is a sectional view of a modified seal having another drive arrangement; and FIG. 10 is a fragmentary sectional view showing the drive ring of the modified seal of FIG. 9 undistorted.

DETAILED DESCRIPTION

Figure 1:
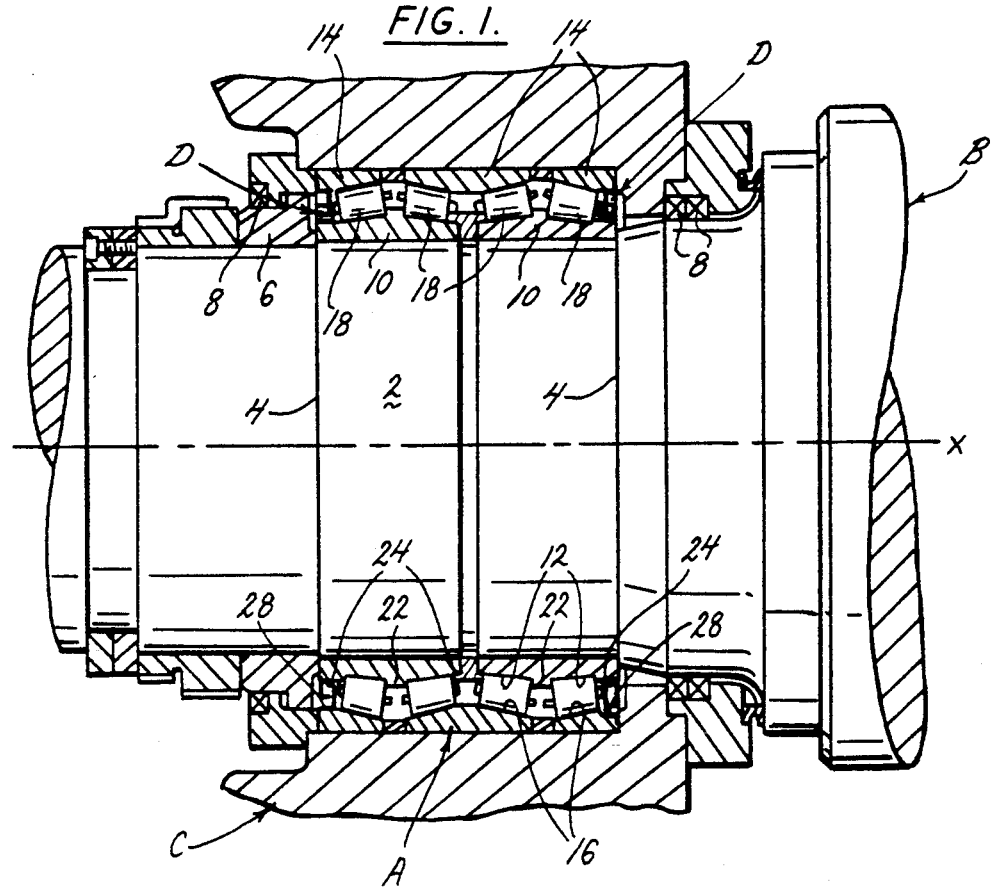
FIG. 1 is a fragmentary sectional view showing the end of a mill row supported in a chock on a tapered roller bearing, the ends of which are closed by seals constructed in accordance with and embodying the present invention.

Referring now to the drawings (FIG. 1), a bearing A supports a mill roll B in a chock C so that the roll B can rotate about an axis X of rotation. Actually, the roll B, which is in a broad sense a shaft, has a roll neck 2 around which the bearing A fits, and the roll neck 2 in turn has a pair of shoulders 4, one of which may serve to position a ring 6. The bearing A lies between the other shoulder 4 and the ring 6. The chock C serves as a housing for containing the bearing A and resisting loads transferred through the bearing A from the roll B. The bearing A is closed at both of its ends with seals D that are carried by and contained fully within the bearing B, there being a separate seal D at each end of the bearing A. The seals D retain a lubricant within the interior of the bearing A and further exclude contaminants from that interior. In this regard, the mill roll B normally operates in a wash of water which cascades over the chock C into which its roll neck 2 extends. The chock C is fitted with additional seals 8 which contact the roll neck 2 and the ring 6, and indeed the seals 8 form the initial barrier to the contaminants. The seals D provide an extra measure of protection for the bearing A and of course retain the lubricant.

The bearing A has inner and outer races and rolling elements arranged in several rows between the races. While various types of bearings have these basic components and may, if properly configured at their ends, accommodate the seals D, the multirow tapered roller bearing best lends itself to the support of mill rolls, and accordingly the particular bearing A depicted is such a bearing. Its inner race constitutes a pair of double cones 10 (FIG. 1), each having outwardly presented raceways 12. Its outer race resides in several cups 14 having inwardly presented raceways 16 located around the raceways 12 of the cones 10. The rolling elements are of course tapered rollers 18 which are arranged in parallel rows, there being a separate row between each cone raceway 12 and the corresponding cup raceway 16. The rollers 18 and their raceways 12 and 16 are on apex, that is to say, if the rollers 18 of any row as well as the raceways 12 and 16 confining that row were extended to their respective apicies, those apicies would, generally speaking, lie at a common point along the axis X of rotation. Each row of tapered rollers 18 is fitted with a cage 20 which serves to maintain the proper spacing between the rollers 18 and to further retain the rollers 18 around the cones 10 when the cones 10 are removed from the cups 14. The two cones 10 fit around the roll neck 2 between the larger shoulder 4 and the ring 6 that is against the smaller shoulder 4. A slip fit exists between the cones 10 and the roll neck 2, and the distance between the shoulders 4 can be as much as 0.040 inches greater than the distance across the two cones 10, thus permitting significant axial displacement of the cones 10 on the roll neck 2. The several cups 14, on the other hand, fit within the chock C where they are clamped tightly together, so that they cannot be displaced axially with respect to the chock C.

The raceways 12 and 16 for the two endmost rows of rollers 18 taper downwardly toward the end of the bearing A, and as a result the rollers 18 of the rows have their large end faces presented toward the middle of the bearing A. The cones 10 have thrust ribs 22 (FIG. 1) against which those large faces bear, and thus the ribs 22 serve to position the rollers 18 axially within the bearing A. Each cone 10 at its ends has retaining ribs 24 which serve to prevent the rollers 18 from sliding off that cone when the cone 10 is detached from the cups 14 which surround it. The retaining ribs 24 at the ends of the bearing A are somewhat longer than the ribs 24 at the center of the bearing A, and indeed each has an extended cylindrical surface 26 (FIG. 2) around which one of the seals D fits. The cups 14 at the ends of the bearing A have bores 28 which encircle the cylindrical surfaces 26 and receive the seals D. The bores 28 open out of their respective cups 14 through short counterbores 30.

Figure 2:
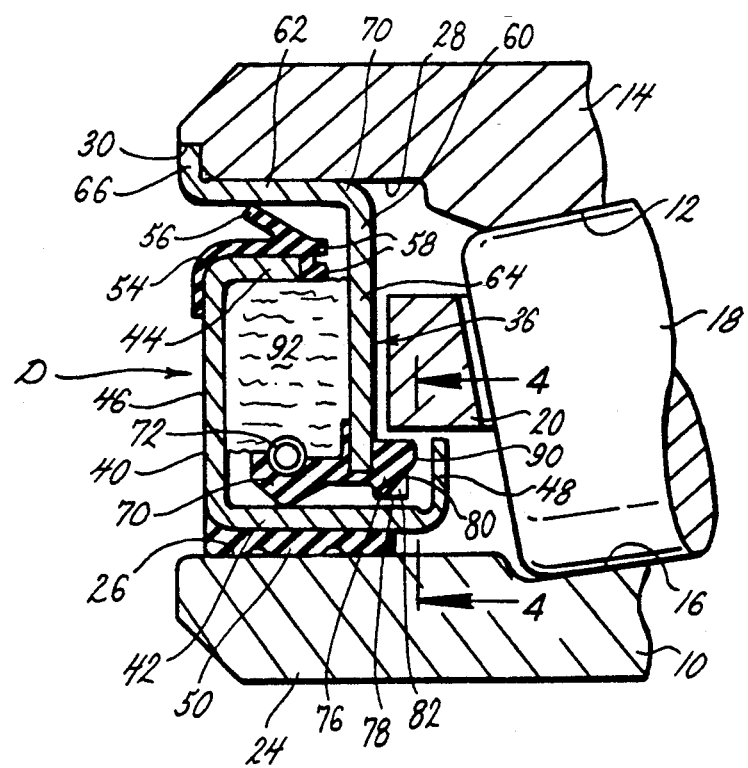
FIG. 2 is an enlarged partial sectional view of one of the seals fitted into the end of the bearing.

Each seal D has two components, namely, a rotating component 34 which is fitted to the cone 10 at one end of the bearing A and a stationary component 36 which fits into the cup 14 at the same end of the bearing A (FIG. 2). The rotating and stationary components 34 and 36 establish two live contact barriers between them as well as at least one labyrinth barrier and thereby effectively close the end of the bearing A at which the seal D is located so as to isolate the interior of the bearing A. Moreover, the two components 34 and 36 are interlocked in the sense that one cannot be withdrawn axially from the other, yet they can shift axially relative to each other for a limited distance.

The rotating component 34 fits around and indeed is mounted on the extended cylindrical surface 26 of the retaining rib 24 at the one end of the bearing A (FIG. 2). It includes a shield 40 which is formed from a relatively rigid substance such as metal, it preferably being a metal stamping. The shield 40 has inner and outer axial walls 42 and 44 and a radial wall 46 connecting the two axial walls 42 and 44. The inner axial wall 42 lies close to and concentric with cylindrical surface 26 of the retaining rib 24, yet does not contact that surface. It covers most of the surface 26, and is considerably longer than the outer axial wall 44 which is set inwardly from the surface of the cup bore 28. The radial wall 46 connects the two axial walls 42 and 44 at those ends of the axial walls 42 and 44 which are presented away from the interior of the bearing A, it merging with the axial walls 42 and 44 at rounded corners. Thus, one end of each axial wall 42 and 44 is formed integral with the radial wall 46. The opposite end of the inner axial wall 42 merges with another radial wall or retaining flange 48 which projects radially outwardly, but is considerably shorter than the radial wall 46. The shield 40 terminates at the opposite end of the outer axial wall 44, and that end is offset from the flange 48, inasmuch as the outer axial wall 44 is considerably shorter than the inner axial wall 42.

In addition, to the shield 40, the rotating component 34 of the seal D has an elastomeric drive ring 50 bonded to the inwardly presented surface of the inner axial wall 42. When unrestrained, the inwardly presented surface of the ring 50 possesses undulations (FIG. 3), and the lesser diameter of the undulated surface is smaller than the diameter of the cylindrical surface 26 of the retaining rib 24. As the rotating component 34 is fitted to the retaining rib 24 of the cone 10, the rib 24 deforms the elastomeric drive ring 50 and causes its undulations to spread out over the cylindrical surface 26 and snugly grip the surface 26. The drive ring 50 positions the shield 40 around the retaining rib 24 of the cone 10 with the two axial walls 42 and 44 of the shield 40 located concentric to the cone 10 at its rib 24. While the fit between the ring 50 and the cylindrical surface 26 is tight enough to enable the rotating component 34 to rotate with cone 10, it is not so tight to prevent the rotating component 34 from repositioning itself axially on the surface 26 when subjected to impacts or other forces. Moreover, the drive ring 50 establishes a fluid-tight static barrier along the cylindrical surface 26 of the rib 24, so that contaminants cannot pass along that surface.

The rotating component 34 further includes an elastomeric seal element 54 (FIG. 2) which is bonded to the outer axial wall 44 of the shield 40, it being attached not only along the outwardly presented surface of that wall, but also at the rounded corner between the axial wall 44 and radial wall 46 as well as along the end edge at the opposite end of the axial wall 44. The seal element 54 has a secondary dirt lip 56 which is directed obliquely outwardly toward the surface of the bore 28 in the surrounding cup 14 as well as toward the open end of that cup. Along the end edge of the outer axial wall 44 for the shield 40, the elastomeric seal element 54 has a pair of concentric rings 58 which project axially toward the interior of the bearing A. Actually the rings 58 are presented toward the stationary component 36 and form a bumper which, when it contacts the stationary component 36, limits the axial distance the rotating component 34 may move relative to the stationary component 36. The two rings 58 further establish a labyrinth along the stationary component 36 to prevent lubricants from escaping from the region behind the seal lip 56.

The stationary component 36 of the seal D fits into the bore 28 in the end of the cup 14 (FIG. 2). It includes a seal case 60, which like the shield 40, is relatively rigid, it preferably being a metal stamping. The case 60 has an axial wall 62 and a radial wall 64 which is directed radially inwardly from one end of the axial wall 62. At its opposite end the axial wall 62 merges into it a short flange 66 which is directed radially outwardly. The axial wall 62 fits snugly into the bore 28 of the cup 14, while the short flange 66 at its end is received in the shallow counterbore 30 of the cup 14. A portion of the chock C fits over the flange 66 and traps it in the counterbore 30, thereby preventing the stationary component 36 from being dislodged axially from the cup 14. An interference fit exists between the axial wall 62 and the surface of the cup bore 28, and this serves not only to hold the stationary component 36 in the cup 14 prior to installation of the bearing A into the chock C, but further establishes a barrier which prevents contaminants from entering the bearing A along the surface of bore 28. This barrier may be enhanced with a sealant. The oblique seal lip 56 on the seal element 54 of the rotating component 34 contacts the inwardly presented surface of the axial wall 62 of the seal case 60 and there establishes a live or dynamic barrier to the ingress of contaminants. The two bumper rings 58, on the other hand, are presented toward and indeed close to the radial wall 64 of the seal case 60 where they create a labyrinth along the wall 64. The inner edge of the radial wall 64 lies between the radial wall 46 and retaining flange 48 of the shield 40, where it is presented toward the inner axial wall 42 of the shield 40.

The stationary component 36 also has an elastomeric seal element 68 (FIGS. 2, 4 and 5) which is bonded to the radial wall 64 of the seal case 60 at the inner margin of that wall. The seal element 68 projects in both axial directions from the radial wall 64. The portion which projects toward the radial wall 46 of the shield 40 takes the form of a primary dirt lip 70 which encircles and contacts the inner axial wall 42 of the shield 40, thus establishing a live or dynamic barrier along the inner axial wall 42. Indeed, the lip 70 carries a garter spring 72 which urges it snugly against the inner axial wall 42 of the shield 40. The lip 70, however, is offset from the radial wall 46 of the shield 40, and that offset is greater than the spacing between the bumper ring 58 carried by the shield 40 and the radial wall 64 of the seal case 60. Thus, the bumper rings 58 will contact the radial wall 64 of the seal case 60 before the dirt lip 70 will contact the radial wall 46 of the shield 40, and as a consequence, the primary dirt lip 70 never touches the radial wall 46.

The portion of the seal element 68 which projects in the opposite direction takes the form of labyrinth lip 76 (FIGS. 2, 4 and 5) having an inwardly presented cylindrical face 78 which is presented toward, but does not contact, the inner axial wall 42 of the shield 40 and a succession of radial faces 80 which lie in a common plane and are presented toward the retaining flange 48 of the shield 40. The lip 76 contains pumping cavities 82 which open out of the cylindrical face 78 and between the radial faces 80 and as such interrupt the edge where the faces 78 and 80 meet. The cavities 82 are configured to pump lubricant, which enters them, back toward the retaining flange 48 of the shield 40 and thence into the interior of the bearing A. To this end each cavity 82 has side faces 84 which are oblique to the direction of relative movement between the rotating component 34 and the stationary component 36 and also an inclined connecting face 86 which is oblique to the axis X. The pumping cavities 82 and their operation are described in more detail in U.S. Pat. No. 4,770,548.

The labyrinth lip 76 further carries a bumper ring 90 which projects axially beyond the radial faces 80 which separate the pumping cavities 82. Actually, the inclined faces 86 of the pumping cavities 82 continue beyond their respective cavities 82 and merge into a common inclined surface which lies along the bumper ring 90, forming its inwardly presented surface. The ring 90 projects toward the retaining flange 48 on the shield 40 of the rotating component 34 and will come against the flange 48 should the rotating element 34 shift far enough along the cylindrical surface 26 on the retaining rib 24 of the cone 10. Even when the bumper ring 90 contacts the retaining flange 48, the oblique secondary lip 56 of the rotating component 34 still remains against the axial wall 62 of the seal case 60 so that the integrity of the dynamic barrier formed by the lip 56 is not lost. The bumper ring 90 further creates part of the labyrinth along the lip 76.

The annular cavity that lies between the primary lip 70 and the secondary lip 56 contains a ring of grease 92 (FIG. 2) which serves to establish a further barrier to the ingress of contaminants.

In operation, the mill roll B rotates relative to the chock C. The cups 14 of the bearing A remain stationary and clamped tightly together within the chock C, whereas the cones 10 rotate with the roll B and within the cups 14, there being minimum friction since the tapered rollers 18 roll along the tapered raceways 12 and 16 of the cones 10 and cups 14, respectively. For each seal D, the lips 70 and 76 on the seal case 60 of its stationary component 36 remain fixed in position at the end of the bearing A, while the inner axial wall 42 of the shield 40 for its rotating component 34 rotates within those lips. On the other hand, the oblique secondary lip 56 on the shield 40 of the rotating component 34 revolves within the axial wall 62 of the seal case 60.

While the bumper ring 90 of the labyrinth lip 76 and the flange 48 of the shield 40 cooperate to form a labyrinth which inhibits the movement of the lubricant to the axial wall 42 of the shield 40, the lubricant which does reach the inner axial wall of the rotating shield 40 encounters the pumping cavities 82 of the labyrinth lip 76. The rotation of the shield 40 directs that lubricant both circumferentially and radially outwardly, the latter being by reason of the centrifugal force imparted to the lubricant. The lubricant thus enters the pumping cavities 82 of the lip 76, and the side faces 84 and connecting faces 86 of those cavities, by reason of their orientation, deflect the lubricant back toward the interior of the bearing A and the rollers 18 and raceways 12 and 16 in that interior. A small amount of lubricant may pass beneath the labyrinth lip 76 when the roll B comes to a rest, inasmuch as the lip 76 does not actually contact the inner axial wall 42 of the shield 40. This lubricant serves to lubricate the primary dirt lip 70.

The primary dirt lip 70 bears against the inner axial wall 42 of the rotating shield 40 to establish a live barrier which excludes contaminants, such as water and dirt, from the interior of the bearing A. The oblique secondary lip 56 revolves with the rotating shield 40 and bears against the axial wall 62 of the fixed seal case 60, thus establishing another live barrier to the ingress of water, dirt and other contaminants. The rotation of the shield 40 exerts a centrifugal force on the oblique lip 56, and, even if the lip 56 loses some of its original set or experiences wear, the centrifugal force will maintain it in contact with the axial wall 62 of the seal case 60. The ring 92 of grease creates still another barrier to the ingress of contaminants.

The drive ring 50 maintains the shield 40 concentric with respect to the retaining rib 24 on the cone 10 and further establishes a static seal with the cylindrical surface 26 on that rib. While it develops enough friction with the cylindrical surface 26 to enable the shield 40 to rotate with the cone 10, it does not excessively restrict axial displacement. Indeed, the rotating component 34 can shift or float axially in response to impacts encountered by the mill roll B, all without creating momentary gaps along the cylindrical surface 26 of the cone rib 24—gaps which could admit contaminants to the interior of the bearing A. The rotating component 36 may simply float owing to inertial forces imparted by the impacts. On the other hand, an impact may thrust the bumper rings 58 of the rotating component 34 against the radial wall 64 of the seal case 60, or it may thrust the flange 48 of the shield 40 against the bumper ring 90 of seal element 54. In either event, the force of the impact may be enough to displace the rotating element 34 axially along the retaining rib 24 to a new axial position. Of course, as the rotating component 34 floats or is otherwise displaced on the cone retaining rib 24, its position with respect to the stationary component 36 changes, from an axial standpoint. Even so, the barriers established by the lips 70 and 76 on the seal case 60 remain just as effective, because they still remain along the inner axial wall 42 of the shield 40, and the same holds true with respect to the oblique lip 56 on the shield 40, for it remains against the axial wall 62 of the seal case 60.

The capacity of the rotating component 34 to float or shift and seek its own position on the retaining rib 24, is limited, because the rotating component 34 is in effect trapped within the stationary component 36. The bumper rings 58 on the end of the outer axial wall 44 of the shield 40 contact the radial wall 64 of the fixed seal case 60, and the radial wall prevents movement in one direction, whereas the retaining flange 48 on the shield 40 contacts the bumper ring 90 on the labyrinth lip 76, and that ring prevents movement in the opposite direction. The rotating seal component 34 seeks its own position between the two extremes, either by being forced into a new axial position or by being restricted from movement by the stationary component 36.

A modified seal E (FIG. 6) is very similar to the seal D, except that it does not have the labyrinth lip 76 that has the capacity to pump the lubricant. Instead, the elastomeric seal element 68 of the stationary component 36 projects from the radial wall 64 of the seal case 60 as a simple labyrinth lip 96 which terminates at a pair of concentric rings 98 that project toward the retaining flange 48. The rings 98 serve as bumpers for limiting the displacement of the rotating seal component 34 relative to the stationary seal component 36. Together with the groove between them, they establish a labyrinth along the retaining flange 48, and this labyrinth inhibits the movement of lubricant toward the inner axial wall 42 of the shield 40.

Another modified seal F (FIG. 7) is quite similar to the seal E. However, the radial wall 64 of its seal case 60 along its inner margin, turns axially toward the interior of the bearing A in the form of a short axial segment 100. The seal element 68 of the case has an axial lip 102 in which the axial segment 100 of the case 60 is embedded, and the lip 102 likewise projects toward the retaining flange 48. It functions as an initial labyrinth to inhibit migration of the lubricant along the flange 48, and being rigidified, it further serves as a highly effective bumper. The seal element 54 on the outer axial wall 44 of the shield 40, instead of having a pair of rings 58, has a single bumper ring 104 which projects toward the radial wall 64 of the seal case 60, it being rigidified by the outer axial wall 44 of the shield 40.

With any of the seals D, E or F, the elastomeric drive ring 90 may be eliminated and the inner axial wall 42 of the shield 40 reduced in diameter, so that it fits around the cylindrical surface 26 of the cone retaining rib 24, perhaps with a slight clearance (FIG. 8). The retaining rib 24, on the other hand, is provided with two annular grooves 106 which open out of its cylindrical surface 26, and these grooves are fitted with elastomeric O rings 108. The depth of each groove 106 is less than the diameter of the 0-ring 108, so that when unrestrained, the O ring 108 will project from its groove 106. Moreover, the width of the groove 106 exceeds the diameter of the O-ring 108 to provide the groove 106 with enough volume to enable the elastomeric ring 108 to be deformed into it. The inner axial wall 42 of the shield 40, when forced over the retaining rib 26 of the cone 10, deforms the O-rings 108, somewhat flattening them, but they nevertheless bear with enough force against the inner axial ring 42 to impart the rotation of the cone 10 to the shield 40. They further establish an effective static barrier between the retaining rib 24 and the inner axial wall 42, yet permit the rotating seal component 34 to float axially on or be displaced relative to the rib 24 and seek its own position within limits.

Another modified seal G (FIGS. 9 and 10) utilizes a different arrangement for positioning the shield 40 of its rotating component 34 on the retaining rib 24 of the cone 10 such that the rotating component 34 may shift axially along the extended cylindrical surface 26 of the rib 24. The shield 40, instead of having its inner axial wall 42 of uniform diameter, as do the shields 40 for the seals D, E, and F, has its inner axial wall 42 divided into large and small diameter segments 110 and 112 which are joined at a radial offset 114 located intermediate the two ends of the inner axial wall 42. The radial wall 46 of the shield 40 extends from the large diameter segment 110, while the retaining flange 48 extends from the small diameter segment 112, and thus the small diameter segment 112 lies closer to the interior of the bearing A, and the rollers 18. The diameter of the small segment 112 is such that it slides over the cylindrical surface 26 of the retaining rib 24 for the cone 10 with enough ease to enable the rotating component 34 to shift axially on the cone rib 24 under the forces normally encountered by it, yet it remains in tight enough contact with the cylindrical surface 26 to enable heat to be readily transferred by conduction from the shield 40 to the retaining rib 24 of the cone 10. In this regard, the friction between the dirt lip 70 on the stationary component 36 and the inner axial wall 42 of the rotating component 34 generates some heat which may elevate the temperature of the seal G excessively. The metal-to-metal contact between the small diameter segment 112 of the axial wall 42 for the rotating component 34 and the retaining rib 24 of the cone 10 dissipates much of that heat.

The large diameter segment 110, which is the longer of the two segments 110 and 112 in the axial wall 42, also encircles the retaining rib 24 of the cone 10, but lies outwardly from the cylindrical surface 26 of the rib 24. Nevertheless, it has bonded to it an elastomeric drive ring 116 which, when undistorted (FIG. 10) has an undulated and ribbed inwardly presented surface, the diameter of which is less than the diameter of the small segment 112. The drive ring 116 extends from the offset 114 for the entire length of the large diameter segment 110, and at the end of the axial wall 42 turns outwardly along the radial wall 46, to which it is bonded for a short distance. Thus, when the rotating component 34 is installed over the retaining rib 24 of the cone 10, the drive ring 116 is distorted and snugly grips the cylindrical surface 26 of the retaining rib 24.

The outer axial wall 44 for the shield 40 carries a seal element 54 that resembles the seal element 54 of the seal F, in that it has a single uniform bumper ring 104.

Turning now to the rotating component 34 for the seal G, its metal seal case 60 and elastomeric seal element 54 closely resemble their counterparts in the seals D, E, and F. The dirt lip 70 of the seal element 54 encircles and bears against the large diameter segment 110 of the inner axial wall 42 for the shield 40, whereas its labyrinth lip 76 encircles, but does not contact, the small diameter segment 112. Thus, the offset 114 in the axial wall 42 of the shield 40 lies between the dirt and labyrinth lips 70 and 76 of the seal element 54. Preferably the dirt lip 70 contains a PTFE (polytetrafluoroethylene) insert 118, and it is along the insert 118 that the lip 70 actually contacts the large diameter segment 110 of the inner axial wall 42 for the shield 40. The coefficient of friction between PTFE and metal is considerably less than that between an elastomer and metal, and this reduces the generation of heat and rise in temperature at the seal G.

In use, the seal G closes the end of the bearing A in essentially the same manner as do the seals D, E and F. Heat generated by reason of the friction between the dirt lip 70 of stationary component 36 and the axial wall 42 on the shield 40 of the rotating components, dissipates into the cone 10, which is a large heat sink, by reason of the metal-to-metal contact between the small diameter segment 112 of the inner axial wall 42 and the retaining rib 24 of the cone 10, so the seal G remains at moderate temperatures.

This invention is intended to cover all changes and modifications of the example of the invention herein chosen for purposes of the disclosure which do not constitute departures from the spirit and scope of the invention.

What is claimed is:

1. In combination with a nonrotatable outer member having a bore and a rotatable inner member that is located within the bore, an improved seal for establishing fluid barriers between the outer and inner members, said seal comprising: a generally rigid shield located around the inner member for rotation therewith, the shield having an axial wall that surrounds the inner member and first and second radial walls that extend outwardly toward the outer member at the ends of the axial wall; a flexible first seal element carried by the shield and located at the periphery of the first radial wall, the first seal element having a flexible lip which projects outwardly; a generally rigid seal case located in the bore of the outer member and having an axial wall which the lip of the first seal element contacts to establish a fluid barrier between the case and shield, the seal case also having a radial wall which extends radially inwardly from one end of its axial wall toward the axial wall of the shield; a flexible second seal element carried by the seal case at the inner margin of its radial wall where it is located between the radial walls of the shield, the second seal element having a lip which contacts the axial wall of the shield to establish another fluid barrier between the case and shield, the second seal element being shorter than the spacing between the radial walls on the shield, so that the shield can shift axially with respect to the seal case between limits while the lips of the seal elements remain in contact with the axial walls of the shield and case; first bumper means located between the first radial wall of the shield and the radial wall of the case in the region of the first seal element for limiting the distance those radial walls can approach each other and thereby limiting the distance the shield can shift axially with respect tot he case in one direction, the first bumper means being formed from a flexible material and providing a bumper independently of the lip of the first seal element establishing a fluid barrier, so that the fluid barrier established by the lip of the first seal element will remain when the bumper limits the distance that the first radial wall of the shield and the radial wall of the case approach each other, the lip of the second seal element being spaced from the radial walls of the shield when the first bumper means limits the distance that the first radial wall of the shield and the radial wall of the case can approach each other; and second bumper means located between the second wall of the shield and the radial wall of the case in the region of the second seal element for limiting the distance that those radial walls can approach each other to thereby limit the distance that the shield can shift axially with respect to the case in the other direction, the second bumper means also being formed from a flexible material.

2. The combination according to claim 1 wherein the first bumper means includes a first elastomeric bumper carried by the shield and presented toward the radial wall of the seal case and the second bumper means comprises a second elastomeric bumper carried by the seal case and presented toward the second radial wall of the shield.

3. The combination according to claim 2 wherein the first bumper is on the first seal element and the second bumper is on the second seal element.

4. The combination according to claim 1 wherein the second seal element also includes a second lip configured to cooperate with the shield to establish a barrier to the passage of a lubricant along the shield.

5. The combination according to claim 4 wherein the other lip normally does not contact the shield, but does establish a labyrinth along the shield.

6. The combination according to claim 1 and further comprising an elastomeric drive element interposed between at least a segment of the axial wall for the shield and the inner member where it is deformed so as to impart the rotation of the inner member to the shield and first seal element while enabling the shield to shift axially on the inner member.

7. The combination according to claim 6 wherein another segment of the axial wall for the shield contacts the inner member to enable heat to be conducted from the shield to the inner member.

8. The combination according to claim 6 wherein an interference fit exists between the axial wall of the case and the surface of the bore in the outer member.

9. The combination according to claim 1 wherein the second seal element includes another lip which surrounds, but is spaced slightly from, the axial wall of the shield, the other lip having a face which is presented toward, but spaced axially from, the second radial wall of the shield and pumping cavities which open out of that face; and wherein the second bumper projects axially beyond the face out of which the pumping cavities open, so that when the second bumper contacts the second wall of the shield, the face out of which the pumping cavities open remains spaced from the second radial wall.

10. The combination according to claim 9 wherein the second bumper is formed integral with the second seal element.

11. A seal comprising: a generally rigid shield having an axial wall and first and second radial walls at opposite ends of the axial wall; a generally rigid case having an axial wall generally surrounding the axial wall of the shield and a radial wall projecting inwardly at one of the ends of its axial wall toward the axial wall of the shield so that the radial wall of the case is located between the radial walls of the shield; a first flexible seal element carried by the shield and located at the periphery of the first radial wall of the shield, the first seal element having a lip which contacts the axial wall of the case to establish a live fluid barrier with the case; a second seal element carried by the radial wall of the case and having at least one lip which cooperates with the axial wall of the shield to establish a live fluid barrier with the shield, the second seal element being shorter than the spacing between the radial walls of the shield, so that the shield can shift axially with respect tot he case, a flexible first bumper located on the first wall of the shield and projecting therefrom toward the radial wall of the case such that the first bumper will contact the radial wall of the case while the second seal element is spaced from the first wall of the shield to thereby limit the distance the shield can shift axially with respect tot he case in one direction, the first bumper serving to limit movement of the shield relative to the case independently of the lip on the first seal element, so that lip maintains the fluid barrier between the shield and case when the first bumper bears against the radial wall of the case; and a flexible second bumper carried by the radial wall of the case and projecting away from that wall toward the second wall of the shield such that it will contact the shield and also limit the distance that the shield will shift axially relative to the case in the other direction.

12. A seal according to claim 11 wherein the first bumper is formed integral with the first seal element and the second bumper is formed integral with the second seal element.

13. A seal according to claim 12 wherein the second element has two lips, one of which contacts the axial wall of the shield and the other of which is present toward and establishes a labyrinth along the shield; and wherein the second bumper is on and projects axially beyond the other lip.

14. A seal according to claim 12 wherein the shield has another axial wall at the periphery of its first radial wall and the second seal element is attached to the outer axial wall with the first bumper being at the end of that other axial wall.

15. A seal according to claim 12 wherein at least one of the bumpers is configured to establish a labyrinth along the radial wall toward which it is presented.

16. A seal according to claim 11 and further comprising an elastomeric drive ring bonded to the inwardly presented surface of the axial wall for the shield, the drive ring having an undulated inwardly presented surface.

17. A seal according to claim 16 wherein the axial wall of the shield has a radial offset which divides the axial wall into segments of differing diameter; wherein drive ring is bonded only to the large diameter segment; and wherein the second seal element has two lips, one of which encircles the large diameter segment of the axial wall for the shield and the other of which encircles the small diameter segment.

18. A seal for establishing a fluid barrier around an axis of rotation, said seal comprising: a seal case formed from a generally rigid material and having an axial wall and a radial wall projecting inwardly from the axial wall; a shield formed from a generally rigid material and located generally within the seal case, the shield having an axial wall toward which the radial wall of the case projects and first and second radial walls which project outwardly from the axial wall such that the radial wall of the case is interposed between the radial walls of the shield, the shield being capable of shifting axially to and fro and with respect to the case; an outer seal element formed from an elastomeric material and carried by the first radial wall of the shield, the outer seal element having a bumper which is presented toward the radial wall of the case and limits the distance that the shield may shift axially relative to the case in one direction, the outer seal element also having a lip which extends generally obliquely with respect to the axis and contacts the axial wall of the case to establish a live fluid barrier with the case, the lip remaining in contact with the axial wall of the case when the shield shifts axially with respect tot he case, the lip functioning as a barrier independently of the bumper functioning as a limit, so that the lip continues to maintain a barrier with the case when the first bumper bears against the case; an inner seal element formed from an elastomeric material and carried by the radial wall of the case, the inner seal element having a bumper which is presented toward the second radial wall of the shield and limits the distance that the shield may shift axially relative to the case in the opposite direction, the inner seal element also having an end lip which contacts the axial wall of shield to establish a live fluid barrier with the shield and remains in contact with that axial wall when the shield shifts axially relative to the case, the end lip being spaced from both of the radial walls of the shield even when the bumper of the first seal element is against the radial wall of the case and when the bumper of the second seal element is against the second wall of the shield, whereby the shield can float axially relative to the case without disrupting the integrity of the fluid barriers established by the lips of the inner and outer seal elements.

19. A seal according to claim 18 wherein the inner seal element also includes another lip that is interposed between its bumper and the end lip and is configured to impede the movement of a lubricant along the axial wall of the shield.

20. A seal according to claim 19 wherein the other lip of the second seal element has a circumferential face that is presented toward the axial wall of the shield and a radial face that is presented toward the second radial wall of the shield and also pumping cavities which open out of the circumferential and radial walls; and wherein the bumper on the inner seal element projects axially beyond the radial face of the other lip.

21. A seal according to claim 18 and further comprising a drive element formed from an elastomeric material and attached to the axial wall of the shield where it is presented inwardly toward the axis.

22. A seal according to claim 21 wherein the axial wall of the shield has large and small diameter segments and the elastomeric drive element is on the large segment, the small segment being exposed on its presented surface to contact a metal surface over which the shield is fitted and thereby dissipate heat from the shield.

23. In combination with a chock, a shaft that rotates within the chock about an axis of rotation, and a bearing that supports the shaft in the chock, the bearing having an inner race fitted around the shaft and provided with an outwardly presented raceway, an outer race fitted into the chock and provided with an inwardly presented raceway which surrounds the raceway of the inner race, and rolling elements located between and contacting the raceways of the inner and outer races, the outer race having a bore located at its and beyond its raceway and the inner race having a cylindrical surface located at its end beyond its raceway, with the cylindrical surface being presented outwardly and being located generally within the bore, whereby an annular space exists at the end of the bearing; an improved seal for closing the annular space at the end of the bearing, said seal comprising: a generally rigid seal case mounted in the outer race and having an axial wall, a radial wall directed inwardly from the axial wall, and a flange directed outwardly from the radial wall, the axial wall being located within the bore at the end of the outer race and the flange being captured between the outer race and the chock so that the case cannot shift axially in the outer race; a generally rigid shield mounted on the inner race and having an axial wall and a radial wall projecting outwardly from the axial wall, the axial wall of the shield encircling the cylindrical surface on the inner race; a drive element mounted between the axial wall of the shield and the cylindrical surface of the inner race, the drive element being formed from a flexible material and enabling the shield to rotate with the inner race, yet move axially to and fro over the cylindrical surface, whereby the shield may shift axially with respect to the case; a first seal element mounted on the radial wall of the shield and having a lip which bears against the axial wall of the case, the first seal element being formed from a flexible material; a second seal element mounted on the radial wall of the case and having a lip which bears against the axial wall of the shield, the second seal element being formed from a flexible material; and bumper means for limiting the distance the shield can shift axially with respect to the case.

24. The combination according to claim 23 wherein the bumper means is interposed between the radial walls of the case and shield and if formed from a flexible material.

25. The combination according to claim 24 wherein the shield has another radial wall located such that the radial wall of the case is interposed between the two radial walls of the shield and the bumper means is also interposed between the radial wall of the case and the other radial wall of the shield.

* * * * *